US012259979B2

(12) United States Patent
Arnoth et al.

(10) Patent No.: US 12,259,979 B2
(45) Date of Patent: Mar. 25, 2025

(54) METHOD AND COMPUTER SYSTEM FOR DETERMINING A THREAT SCORE

(71) Applicant: CYAN SECURITY GROUP GMBH, Vienna (AT)

(72) Inventors: Peter Arnoth, Vienna (AT); Markus Cserna, Hagenbrunn (AT)

(73) Assignee: CYAN SECURITY GROUP GMBH, Vienna (AT)

(*) Notice: Subject to any disclaimer, the term of this patent is extended or adjusted under 35 U.S.C. 154(b) by 949 days.

(21) Appl. No.: 16/315,086

(22) PCT Filed: Jul. 4, 2017

(86) PCT No.: PCT/EP2017/066565
§ 371 (c)(1),
(2) Date: Jan. 3, 2019

(87) PCT Pub. No.: WO2018/007350
PCT Pub. Date: Jan. 11, 2018

(65) Prior Publication Data
US 2019/0311132 A1    Oct. 10, 2019

(30) Foreign Application Priority Data
Jul. 4, 2016 (EP) .................................. 16177783

(51) Int. Cl.
*G06F 21/57* (2013.01)
*G06F 21/53* (2013.01)
(Continued)

(52) U.S. Cl.
CPC ............ *G06F 21/577* (2013.01); *G06F 21/53* (2013.01); *G06F 21/566* (2013.01); *H04L 63/1416* (2013.01); *H04L 63/1433* (2013.01)

(58) Field of Classification Search
CPC ...... G06F 21/577; G06F 21/53; G06F 21/566; G06F 21/6272; H04L 63/1433;
(Continued)

(56) References Cited

U.S. PATENT DOCUMENTS 8,990,945 B1 * 3/2015 Ranadive ............ H04L 63/1433
726/24
9,104,867 B1 * 8/2015 Thioux .................. G06F 21/566
(Continued)

FOREIGN PATENT DOCUMENTS

WO     2010002816 A1    1/2010

OTHER PUBLICATIONS

ISA European Patent Office, International Search Report Issued in Application No. PCT/EP2017/066565, Aug. 7, 2017, WIPO, 3 pages.

*Primary Examiner* — Benjamin E Lanier
(74) *Attorney, Agent, or Firm* — McCoy Russell LLP (57) ABSTRACT

A method and a computer system are disclosed for determining a threat score of an electronic document comprising the steps of: loading and rendering the electronic document in a document sandbox, controlling the document sandbox to simulate user interaction with the electronic document, while loading and rendering the electronic document and while controlling the document sandbox to simulate user interaction with the electronic document, monitoring the document sandbox for events triggered by the electronic document and belonging to one of at least two predefined event classes, recording each observed event together with a respective event class to which each observed event belongs, and determining a threat score of the electronic document based on predefined numerical weights associated with each of the predefined event classes to which the recorded events belong.

20 Claims, 1 Drawing Sheet

(51) Int. Cl.
*G06F 21/56* (2013.01)
*H04L 9/40* (2022.01)

(58) Field of Classification Search
CPC ..... H04L 63/1416; H04L 67/22; H04L 67/02; H04W 12/00503
See application file for complete search history.

(56) References Cited

U.S. PATENT DOCUMENTS

| | | | |
|---|---|---|---|
| 9,391,832 B1* | 7/2016 | Song | G06F 12/1408 |
| 2010/0064369 A1* | 3/2010 | Stolfo | G06F 21/566 |
| | | | 726/24 |
| 2011/0185421 A1* | 7/2011 | Wittenstein | H04L 63/1425 |
| | | | 726/22 |
| 2011/0289582 A1* | 11/2011 | Kejriwal | G06F 21/566 |
| | | | 726/22 |
| 2012/0204250 A1* | 8/2012 | Anderson | H04L 63/18 |
| | | | 726/9 |
| 2012/0311702 A1* | 12/2012 | Krstic | G06F 21/53 |
| | | | 726/22 |
| 2013/0014020 A1* | 1/2013 | Dixon | G06F 21/44 |
| | | | 715/738 |
| 2014/0380482 A1* | 12/2014 | Thomas | G06F 21/566 |
| | | | 726/24 |
| 2015/0039513 A1* | 2/2015 | Adjaoute | G06Q 20/12 |
| | | | 705/44 |
| 2019/0311132 A1* | 10/2019 | Arnoth | G06F 21/53 |

\* cited by examiner

METHOD AND COMPUTER SYSTEM FOR DETERMINING A THREAT SCORE

CROSS-REFERENCE TO RELATED APPLICATIONS

The present application is a U.S. National Phase of International Patent Application Serial No. PCT/EP2017/066565 entitled "METHOD AND COMPUTER SYSTEM FOR DETERMINING A THREAT SCORE," filed on Jul. 4, 2017. International Patent Application Serial No. PCT/EP2017/066565 claims priority to European Patent Application No. 16177783.4, filed on Jul. 4, 2016. The entire contents of each of the above-cited applications are hereby incorporated by reference in their entirety for all purposes.

TECHNICAL FIELD

The present invention relates to IT security, and more particularly to a method, a computer program product and a computer system for determining a threat score of an electronic document.

BACKGROUND AND SUMMARY

In relation with electronic documents IT security is mainly concerned with the detection and/or prevention of malicious behaviour caused by electronic documents. Electronic documents may be web pages, scripts or document files. They may be accessed using a web browser or other document viewer. Malicious behaviour refers to actions that may harm the computer system accessing the electronic document, in particular actions that may harm the data stored on that computer system, and to actions compromising data security or privacy, in particular by illegitimate transmission or misuse of data accessible on that computer system.

In the past detection of malicious behaviour caused by electronic documents has been achieved by operating specialised programs, e.g. anti-virus engines or virus scanners, on the computer system accessing electronic documents. Such specialised programs usually monitor the behaviour of other programs running on the computer system for program activities that are classified as malicious behaviour (e.g. accessing and modifying the operating system of the computer system, installing background processes or intercepting human interface device drivers). The monitoring is performed while the user is operating the computer system and interacting with the electronic document. Once any such malicious event is detected, the specialised program takes immediate action to block any further actions triggered by the electronic document and to remove the electronic document from the computer system. I.e. once an electronic document is categorized as "malicious", any further analysis of the electronic document or its behaviour is interrupted (or manually deactivated by a user of the computer system). This approach has several disadvantages: first, the specialised program must be present and running locally on the user device thus consuming memory and computing resources on this device; second, by detecting malicious behaviour only when it happens on the user device, the specialised program can provide protection from the effects of the electronic document but cannot prevent access to the electronic document thus wasting bandwidth for transferring the electronic document to the user device; third, the specialised program is limited to the detection of local effects and cannot protect against off-device (remote) effects triggered by the electronic document (e.g. modification of remotely stored files).

To overcome some of the disadvantages, remote security measures in form of access filters have been deployed. Such access filters can be implemented with proxy servers over which the user device accesses electronic documents. The access filters analyse the content of any accessed electronic document before transmitting it to the user device. The analysis is performed by searching for certain predefined patterns in the content, which previously have been found to indicate a malicious behaviour of the electronic document. No actual rendering or execution of the electronic document is performed. Consequently, strategies for avoiding detection by such access filters have evolved. For instance parts of electronic documents may be obfuscated and/or encrypted until they do not match any predefined pattern applied by the access filter during its static content analysis. Therefore the present access filters cannot replace the use of local specialised programs for increased security of the user device.

As an additional security measure modern web browsers use a sandbox, i.e. a tightly controlled and limited environment, for loading and rendering web pages. The limitations imposed by the sandbox on the document inside restrict most effects of malicious behaviour to the sandbox itself. This is achieved by separating the context in which the document is loaded and plug-ins or scripts are executed from a presentation layer which has direct access to parts of the host device (e.g. the user device running the web browser). The sandbox of a web browser achieves security by enforcing certain behavioural restrictions. It generally does not monitor the behaviour compliant with said restrictions. Consequently it is not in a position to combine information on different permissible but suspicious behaviours to provide any evaluation or categorization of a documents.

Outside the field of IT security it is known to analyse the dynamic behaviour of electronic documents in sandboxes for quality assurance. In these applications the electronic document under test is loaded and rendered in a document sandbox. Then a number of tests is performed, wherein for each test it is observed whether a certain predefined interaction with the electronic document in the document sandbox leads to a predefined expected behaviour. The outcome of such a test procedure is either a "pass" when each of the required tests performed has led to the respective expected behaviour or a "fail" otherwise. One example of such a document sandbox is PhantomJS (see http://phantomjs.org/). PhantomJS provides a document sandbox adapted for the use with web pages; specifically it implements a web browser sandbox for headless web site testing and monitoring.

US 2011/0289582 A1 shows an apparatus and system for scoring and grading websites and a method of operation. The system uses a browser emulator to load websites from one or more Uniform Resource Identifies. The scoring and grading is based on the behaviour of a website as characterized by the invoked APIs, functions and program libraries. With regard to dynamic behaviour of the website, the method is limited to examination of initial JavaScript and JavaScript that is requested by a predecessor JavaScript. It includes examination of responses received for deferred client requests. Overall, the method is limited to examination of the self-acting behaviour of the website. Therefore, a malicious website can spoof the scoring and avoid a negative grading, e.g. by triggering malicious behaviour only upon user interaction.

A similar method for scoring and grading is disclosed in U.S. Pat. No. 8,990,945 B1, with similar limitations.

US 2013/0014020 A1 discloses a system and method for managing a database of reputations of websites and indicating a reputation of a website to a client accessing said website.

WO 2010/002816 A1 shows a system and method for categorization of websites and for using said categorization for operating an access filter.

An object of the present invention is to provide a security classification of electronic documents, which can be used to operate an access filter remote from a user device and which is more difficult to spoof than known schemes for security classification.

In order to achieve the objective mentioned above, the present invention provides a method as defined in the outset, comprising the steps of:
- loading and rendering the electronic document in a document sandbox;
- controlling the document sandbox to simulate user interaction with the electronic document,
- while loading and rendering the electronic document and while controlling the document sandbox to simulate user interaction with the electronic document, monitoring the document sandbox for events triggered by the electronic document and belonging to one of at least two predefined event classes;
- recording each observed event together with a respective event class it belongs to;
- determining a threat score of the electronic document based on predefined numerical weights associated with each of the predefined event classes to which the recorded events belong.

In order to achieve the objective mentioned above, the present invention provides a computer program product as defined in the outset, comprising program parts, which when loaded onto a computer are designed to perform the method steps of the present method.

In order to achieve the objective mentioned above, the present invention provides a computer system as defined in the outset, comprising:
- a document sandbox module for loading and rendering electronic documents,
- an interaction simulation module connected to the document sandbox module and configured to control the document sandbox module to simulate user interaction with the electronic document,
- a monitoring module connected to the document sandbox and configured to monitor the document sandbox module for events belonging to one of at least two predefined event classes and to record each observed event together with a respective event class it belongs to, and
- a scoring module connected to the monitoring module and configured to determine a threat score based on predefined numerical weights associated with each of the predefined event classes to which the events recorded by the monitoring module belong.

In particular the present invention can be applied to web pages, i.e. electronic documents accessible via the World Wide Web using a web browser for displaying such documents on a user device for viewing of and/or interacting with the document, usually identified by a Uniform Resource Locator (URL). Basically the present invention provides a behavioural security classification of electronic documents based on a number of different predefined "suspicious" behaviours, each associated with a certain security rating. In this context "behavioural" refers to the runtime behaviour and means that the electronic documents are analysed by simulating the situation on a user device and actually loading and rendering the document similar to a document viewer used by the end user. For this purpose a document sandbox is used, which provides a realistic yet safe environment for loading, rendering and interacting with the electronic document. As mentioned above, such document sandboxes have previously been used for quality assurance of electronic documents, i.e. to find errors and bugs within the electronic document. For instance when testing a web page a corresponding web sandbox implements a full internet browser engine with programming interfaces to/from other machines or scripts.

In the document sandbox electronic documents are processed as if loaded and rendered in a real document viewer, but instead loaded and rendered without a human interface or graphical output only for the purpose of monitoring the behaviour and optionally automating interactions with the document. All user interactions with the electronic document are implemented through programming interfaces (APIs) which can be controlled from outside the sandbox. User interactions like clicking on buttons or following links on a web page (simulating the user interaction of a mouse click) or executing web forms can be controlled via methods of automation through predefined scripts. It is also possible to simulate "passive" interactions, like hovering a mouse pointer over a specific content or part of the document, that may cause certain reactions in form of scripts to be executed within the sandbox. These reactions are again monitored, recorded and processed when determining a threat score of the electronic document.

The threat score is a numeric classification of the security risk associated with accessing the respective electronic document on a user device. As such, a remote access filter aware of the threat score of an electronic document can deny a user device access to said document based on a given acceptable range of threat scores, if the score of the document concerned is outside said acceptable range. The acceptable range can be adjusted for each access filter and/or for each user device depending on an acceptable threat level or acceptable security risk. Alternatively a general categorization of each electronic document may be performed by comparing the determined threat score with a predefined threshold (high watermark) and putting all documents having a threat score exceeding said threshold on a blacklist which allows access filters or other security devices to prevent access to these documents.

The present method comprises the step of, while monitoring the document sandbox, controlling the document sandbox to simulate user interaction with the electronic document. By simulating user interactions, suspicious behaviour triggered only by user interactions can be observed and taken into account when determining the threat score. Therefore the security analysis of the electronic document achieves a more complete coverage of use-cases of the electronic document, which makes it generally more difficult to spoof the analysis; in particular, a malicious website cannot avoid detection of malicious behaviour by triggering said malicious behaviour only upon user interaction.

Specifically a simulated user interaction may comprise simulated mouse movements, simulated mouse clicks and/or keyboard inputs. Mouse movements and clicks may be performed according to some or all input elements (links, buttons, etc.) recognized when rendering the document, e.g. by moving the mouse over one of said elements and simulating a mouse click. Keyboard inputs may be performed with respect to some or all form elements recognized when rendering the document, e.g. by assigning focus to one of said form elements and simulating a sequence of key presses.

With regard to the monitored behaviour preferably one or more of the at least two predefined event classes are network resource requests of the document sandbox. By monitoring the behaviour of the document sandbox for suspicious network resource requests, remote effects triggered by the electronic documents and recognized as suspicious behaviour can be taken into account when determining the threat score.

Specifically meta data and/or content of any network resource request of the document sandbox may be analysed for one or more of the following network resource request classes, which can be part of the at least two predefined event classes: requests of resources from locations different from an origin of the electronic document (e.g. external suspicious web sites, whereas these web sites are already a known source of malicious code (prior detection) or of dubious content (web content categorization)); requests of resources from locations in different countries than the origin of the electronic document; requests of documents for which a threat score outside a predefined acceptable range has been determined earlier; requests of resources from locations matching a pattern defined on a location blacklist, in particular loading of suspicious scripts from foreign domains (indicative of "cross-site scripting"); requests transferring data tokens (e.g. cookies, identifiers or access keys) to locations matching a pattern defined on the location blacklist, in particular whereas the target location/domain may be already known of serving dubious content (this practice is also referred to as "cookie stealing"); and/or resources matching a predefined pattern of malicious content. A resource can be another electronic document (e.g. a script or image file) or an API endpoint triggering further effects when accessed.

Further regarding the monitored behaviour, preferably one or more of the at least two predefined event classes are script function invocations inside the document sandbox. Script function invocations generally provide a reliable link to activities triggered by the electronic document in general and therefore also to suspicious behaviour.

Specifically it has turned out instructive to analyse script functions invoked during script execution for one or more of the following function invocation classes, which are part of the at least two predefined event classes: invocations of functions manipulating the rendered document without user interaction; invocations of functions triggering a download without user interaction (which is a common way to distribute malware to users visiting a web site called "drive by download"); and/or invocations of functions listed on a function blacklist (e.g. comprising the JavaScript function "eval"). Functions manipulating the rendered document without user interaction often indicate an attempt to misdirect user interactions and trick the user into performing an action that is not his primary intention ("overlays" or "click-baits"; e.g. by planting an invisible control over a legitimate control in order to provoke actuation of the invisible control when the user actually intends to operate the legitimate control, such as a link or button). Functions triggering a download without user interaction are a common way to distribute malware to users visiting a web site ("drive by download"). Function blacklists can be used to generally restrict acceptable behaviour in terms of script functions, e.g. by penalizing functions accessing local resources of the user devices and/or functions used for obfuscation (although the obfuscated parts will be executed anyway within the document sandbox and accounted for in the overall security assessment of the electronic document).

In addition, one or more of the at least two predefined event classes can be document changes. Monitoring for this type of event may complement or replace monitoring for script function invocation events as it concerns not the functions as such but the effects of their execution on the electronic document within the document sandbox. Thereby specific types of document changes can be interpreted as suspicious behaviour and accounted for in the threat score.

In particular document changes can be analysed for one or more of the following document change classes, which are part of the at least two predefined event classes: changes introducing hidden or invisible elements into the document; and/or changes introducing elements referring to resources from locations different from an origin of the electronic document. Such external resources may be other electronic documents, e.g. additional scripts, that have not been referenced by the original electronic document and therefore would have avoided static content analysis. Hidden or invisible elements again usually indicate an attempt to misdirect user interactions to trigger undesired effects as described above. This approach may be used to confirm certain actions based on credentials provided by the user at an earlier time (e.g. confirm a security clearance or transfer clearance or send messages in the name of the user).

The recorded events can be stored together with the respective event classes in an event database. This allows to collect a behavioural pattern or profile of the electronic document at hand. Based on the stored behavioural profile, later reassessment of the threat score may be performed, e.g. when resources referenced by a given document are later classified as malicious, thereby affecting the threat score of all referring documents. Also such recorded information allows to reproduce the determined threat score and analyse and readjust the weights leading to a certain threat score.

For fast and easy access by security devices such as access filters, the determined threat score of the electronic document can be stored in a filter database. Unlike a blacklist, which stores only a threat categorization by identifying only malicious documents, storing the threat score allows for a more fine-grained control over an acceptable range and for later adjustments or customizations regarding of the acceptable range for different applications.

Thus within the present method the determined threat score can preferably be compared with one or more predefined ranges of threat scores, wherein each range is associated with a threat category. The outcome of the comparison determines a threat category of the electronic document; e.g. it tells "unsafe" from "safe" documents. For instance any electronic documents having a threat score below a predefined low watermark can be categorized as harmless, while documents having a threat score between said low watermark and a predefined high watermark can be categorized as questionable and documents having a threat score above said high watermark can be categorized as malicious. As a consequence access to malicious electronic document may be denied and questionable electronic documents may undergo an additional screening, e.g. by specialised security personnel.

In a preferred application of the present invention access to an electronic document is filtered by determining a threat category of an electronic document to be accessed and denying the access when the electronic document belongs to a predefined security category (which would be the "unsafe" category in the above example).

BRIEF DESCRIPTION OF THE FIGURES

Referring now to the drawings, wherein the figures are for purposes of illustrating the present invention and not for purposes of limiting the same, FIG. 1 schematically shows an architecture of a system for using the present invention with a plurality of document sandboxes operating in parallel.

DETAILED DESCRIPTION

Figure 1:
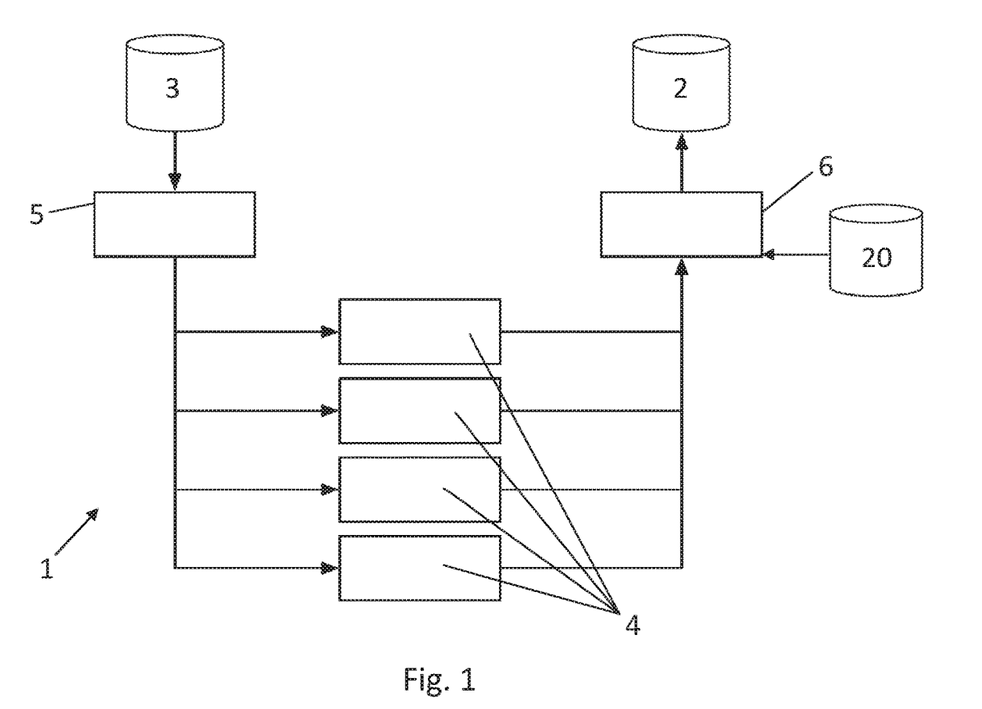

The system 1 shown in FIG. 1 for using the present invention is adapted to populate a filter database 2 based on an input list 3 of electronic documents, e.g. web pages identified by URLs. The filter database 2 can be accessed by Internet Service Providers (ISPs), in particular mobile broadband providers, to operate access filters (not shown) for protecting their clients from accessing malicious web pages. Based on the input list 3 a plurality of web crawlers 4 (also called "spiders") permanently surf the web and mimic the behaviour of human users while analysing the visited web pages. They use the entries of the input list 3 as starting points and automatically navigate, load and render contents of all visited web pages. Each web crawler 4 uses a document sandbox for web pages (in short a web sandbox) to load up and analyse a visited web page for malicious behaviour without actually displaying any graphical output of the web page on a screen.

There can be a fixed or dynamic number of web crawlers 4 used in parallel, depending on the available resources of a hosting computer or platform. Each web crawler 4 can be implemented on a separate virtual machines. Alternatively the hosting may be done by a Function as a Service (FaaS) provider, wherein each of the web crawlers 4 corresponds to a function call. Thus the computer system is an adaptive environment, which allows for an analysis of a high number of electronic documents and web pages in a timely fashion (i.e. following up and analysing new documents as soon as they appear) without human interaction. That said, it will be advantageous to distribute web crawlers 4 geographically and/or frequently change the employed IP ranges in order to avoid detection and evasion by malicious documents and programs. Also it might be advantageous to artificially limit a connection bandwidth and retard a load behaviour of the web crawlers 4 in order for the system to remain undetected.

The URLs in the input list 3 are dispatched to the web crawlers 4 by a dispatcher 5. The dispatcher 5 monitors a set of web crawlers 4 (each comprising a sandbox instance) and waits until one of the web crawlers 4 is in an idle state. If no idle web crawler 4 is available, a new instance may be created, depending on the available resources and computing power. Once an idle web crawler is available, the dispatcher 5 re-initializes the idle web crawler and dispatches an entry from the input list 3 to the idle web crawler. As soon as the analysis of the corresponding web page is finished, the web crawler 4 forwards the results of its analysis (URL accessed, events observed) to a collector 6, which collects those results and acts as a scoring module of the system 1.

Based on the received results, the collector 6 determines a threat score depending on a plurality of predefined numerical weights fetched from a weights database 20. The weights database 20 comprises a numerical weight for each of the predefined event classes to which the events recorded by the web crawler 4 belong. For determining the threat score, the collector 6 sums up the observed events weighted with their respective numerical weights. The resulting sum of numerical weights is the threat score of the analysed web page. Optionally, correlations between observed events may also be taken into account when determining the threat score; e.g. when a combination of certain (correlated) events is observed, the threat score can be increased in addition to the sum of the numerical weights of the individual events due to a "combination match". For instance a combined observation of the events "manipulation of the rendered document", "data transfer to blacklisted location" and "triggering background download" may be penalized in this manner.

The collector 6 writes the threat score and the URL of the analysed web page to the filter database 2. The filter database 2 may preferably contain the determined threat scores as well as all detected malicious behaviours (events) that have been detected and recorded by the web crawlers 4 in relation to the processed electronic document. Electronic documents having a threat score over a certain threshold (high watermark) are marked in as "bad" or "unsafe" and optionally put on a separate blacklist. Document with a threat score of zero (low watermark) are marked as "good" or "safe" and optionally put on a separate whitelist. Documents with a threat score between the high watermark and the low watermark are marked as "needs review" and optionally put on a separate list for further human/manual analysis after which they can be manually categorized to be either "safe" or "unsafe".

Figure 2:
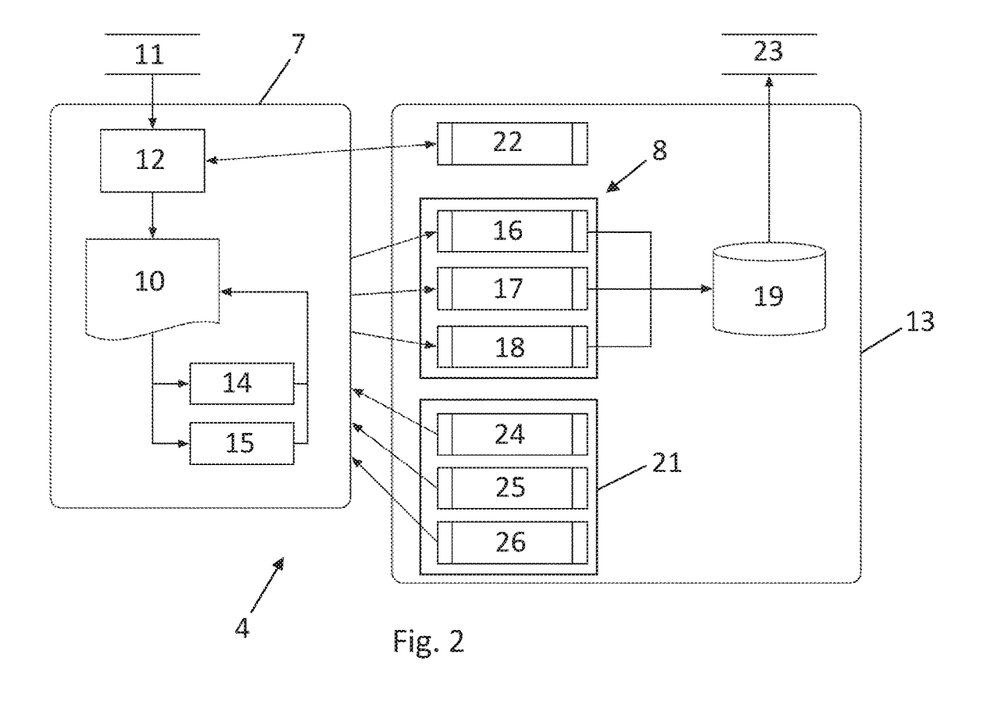
FIG. 2 schematically shows the structure of a computer system and a method for determining a threat score of an electronic document according to the present invention.

As indicated in FIG. 2 each of the web crawlers 4 is itself a computer system comprising a document sandbox module 7 and a threat intelligence engine 13. The document sandbox module 7 is implemented with a standard browser engine without a graphical user interface to speed up the execution of loading web pages. It has an API to allow control and monitoring of the browser engine (e.g. PhantomJS, see http://phantomjs.org/). To eliminate the possibility that the sandbox is detected by malicious code and, as a result, the suspicious behaviour is not performed (sandbox evasion), the same browser engines used in desktop browsers (Chrome, Firefox, Safari, Internet Explorer) can be used inside the document sandbox as sandbox engines. The sandbox engine might for instance be using the WebKit browser rendering engine with an integrated JavaScript engine. The APIs allow for attaching the threat intelligence engine 13 or more specifically a monitoring module 8 and an interaction simulation module 21 of the threat intelligence engine 13. The threat intelligence engine 13 is configured to control the document sandbox module 7 to perform automatic access and navigation of the analysed electronic document, all while monitoring for security relevant threats emanating from said document. It can be implemented as a separate process that interacts with the document sandbox module 7 through its API and tightly controls and monitors the browser engine inside the document sandbox module 7.

The web crawler 4 waits for the dispatch of an URL by the dispatcher 5. As soon as an URL is dispatched, the document sandbox module 7 starts with the analysis of the provided web page. Since no actual graphical rendering needs to be done by the browser engine, the computing power required to load the web page is reduced considerably compared to a conventional browser and a high number of web sandboxes can be operated in parallel on a single physical machine.

The document sandbox module 7 is configured to load (step 12) and render an electronic document 10 (a web page) based on an input URL 11 dispatched to the document sandbox module 7. The input URL 11 is an entry point to a web site (e.g. http://www.cnn.com/) and acts as a starting point for the analysis. The process of loading and rendering the corresponding web page is similar to entering an URL into the navigation bar of a standard client web browser except for the absence of a graphical output device. The electronic document 10 is processed by the sandbox engine and rendered as if graphical output was necessary. In this process, all external resources are requested from target web servers as referred to by the electronic document 10 (e.g. the web page code) and scripts executed in the script engine 15. The script engine 15 is configured to execute scripts that are embedded into the electronic document or that are referred to by the electronic document. Such scripts may actively react on actions from a user or perform background actions when the electronic document is being accessed (e.g. web pages using AJAX, Web APIs or DOM manipulation).

The document sandbox module 7 comprises an interaction engine 14 for performing active user interactions with the electronic document 10. The performed active user actions can be controlled by the threat intelligence engine 13. They can be used to simulate the actions performed when a human being is reading and navigating the electronic document. Such actions may be any of mouse movements and clicks and/or keyboard inputs.

The monitoring module 8 is connected to the document sandbox module 7. Specifically it is attached to a plurality of passive hooks (such as event handlers or callbacks) provided by the API of the document sandbox module 7. The selection of passive hooks by which the threat intelligence engine 13 is connected to the document sandbox module 7 corresponds to at least two predefined event classes monitored for suspicious behaviour. For simplicity in the exemplary representation shown in FIG. 2, the monitoring module 8 comprises only three entry points 16, 17, 18 for passive hooks. In particular the monitoring module 8 comprises a first entry point 16 for a network I/O hook, a second entry point 17 for a script execution hook and a third entry point 18 for a document change hook. The monitoring module 8 is configured to monitor the document sandbox module 7 for events belonging to one of at least two predefined event classes. In addition it is configured to record each observed event together with a respective event class it belongs to in an event database 19 as will be explained in more detail below. The event database 19 collects all events received while the electronic document 10 is processed in the document sandbox.

The first entry point 16 is called whenever the electronic document 10 processed by the document sandbox module 7 performs a network I/O (i.e. causing inbound or outbound network traffic). For example it receives events from the document sandbox module 7 every time an external network resource is requested from a web page. Such a resource request may typically be the loading of an image, of supporting document parts (e.g. additional HTML code), of style sheets or of additional script code (e.g. external JavaScript files). Also scripts executed inside the document sandbox can initiate network communication with a target server to exchange information (e.g. AJAX or Web APIs). The meta data of such network communications (i.e. the target host and port) as well as the contents (i.e. type of resource, content of resource) can thus be analysed by the threat intelligence engine 13 for the purpose of finding communication to (a) targets different than the initial target, i.e. the location of the web site, (b) targets that are in a different country than the initial target, (c) targets that are already known for malicious resources, or (d) content of resources that contain patterns of malicious behaviour. All malicious events detected after analysing the trigger of the first entry point 16 are recorded in the event database 19.

The second entry point 17 is called whenever the electronic document 10 processed by the document sandbox module 7 requires the execution of a script (e.g. when the JavaScript engine is called). It receives events from the document sandbox module 7 every time a script function is executed in the document sandbox. Suspicious script code can be detected when it (a) executes script functions that manipulate the electronic document (e.g. the DOM tree of a web page) without user interaction (such behaviour can indicate overlays or click-bait), (b) triggers a download without user interaction (such behaviour may indicate a drive-by-download), or (c) executes functions used to hide code from static code analysis or pattern matching (e.g. "eval( )" in JavaScript). All observed events meeting one of those criteria after analysing the trigger of the second entry point 16 are recorded in the event database 19.

The third entry point 18 is called whenever the electronic document 10 rendered by the document sandbox module 7 is changed (e.g. when an element of a Document Object Model (DOM) tree of a web page is added, modified or replaced). It receives events from the document sandbox module 7 every time the visible appearance of the electronic document (e.g. as defined by the DOM tree) changes. Following the third entry point 18, malicious behaviour can be detected as (a) introduction of hidden/invisible (HTML) elements into the electronic document, or (b) introduction of new (HTML) elements referring to external resources (e.g. images or scripts from foreign domains). Since changes of the visual appearance are commonly used by legitimate dynamic web pages (AJAX), malicious behaviour is more difficult to detected on such web pages. In any event, all observed events meeting one of the defined criteria are recorded in the event database 19.

Also the interaction simulation module 21 is connected to the document sandbox module 7. Specifically it is attached by action triggers 24, 25, 26 to a plurality of entry points (such as functions or routines) provided by the API of the document sandbox module 7. The selection of entry points to which the action triggers 24, 25, 26 of the threat intelligence engine 13 are connected corresponds to the user interactions simulated by the interaction simulation module 21.

The first action trigger 24 simulates navigating actions on the electronic document 10. Such navigation actions include actively following a link through a navigation object within the electronic document (e.g. the web page). The threat intelligence engine 13, by means of the API of the document sandbox module 7, simulates such navigation actions e.g. by simulating a mouse click on a navigation element of the electronic document 10. The simulated navigation actions may be performed by going through a list of all available navigation elements in the electronic document 10. Said list can be queried by way of the API of the document sandbox module 7, which has rendered the document and hence is aware of all contained elements, including navigation elements.

The second action trigger 25 simulates mouse movements over the rendered electronic document 10. It serves to simulate a human being moving a mouse when viewing the electronic document 10, e.g. over images and other content. Such mouse movements can be used by electronic documents 10 to trigger execution of scripts which would otherwise remain inactive. E.g. such triggers are often used to load advertisements or playing sound or music. The simulation of the mouse movements is achieved through dedicated entry points of the API of the document sandbox module 7.

The third action trigger 26 simulates interaction with form fields in the electronic document 10. The availability of form fields in the electronic document 10 (e.g. web forms such as a login form or a contact form) is detected by the presence of dedicated input elements, which can be queried via the API of the document sandbox module 7. If the presence of at least one form field is detected, the threat intelligence engine 13 simulates filling in data into the form field by way of the API of the document sandbox module 7. E.g. input data from prepared exemplary lists can be used or random data can be generated for filling into the form field(s). Such input can be used by the electronic document 10 to trigger script functions. These are commonly used to validate input data but may be modified to cause malicious behaviour which can therefore be detected by the threat intelligence engine 13.

When the document sandbox module 7 has finished processing the electronic document and all relevant events have been recorded in the event database 19 as described above, a report 23 of the event database 19 comprising all recorded events is transmitted to the collector 6 as explained in connection with FIG. 1 for determining a threat score. The numerical weights used by the collector 6 to determined the threat score may be as follows for the event classes mentioned above (in practice the number of event classes will be higher and the weights will be manually tuned to achieve the desired consumer experience):

| Event class | Weight |
| --- | --- |
| network requests of external resource | 1 |
| network request to different country | 1 |
| network request of "unsafe" document | 5 |
| network request to blacklisted location | 4 |
| data transfer to blacklisted location | 5 |
| request of resource matching "malicious" pattern | 4 |
| manipulation of the rendered document | 3 |
| triggering background download | 3 |
| invocation of blacklisted script function | 3 |
| introduction of hidden or invisible element | 4 |
| introduction of reference to external resource | 2 |

For example when a web page has performed a network request to different country and triggered a background download, its threat score will be 1+3=4. When a web page has not shown any suspicious behaviour, its threat score will be zero.

The threat intelligence engine 13 further comprises a status monitoring module 22 which is connected to a passive hook of the document sandbox module 7 and can be triggered on status changes of the document sandbox (e.g. sandbox loading, sandbox ready, received URL, start loading, finished loading, start rendering, etc.).

Upon initialization of the threat intelligence engine 13, the APIs of the document sandbox module 7 are connected to the threat intelligence engine 13 as described above. In particular, the passive hooks are connected to entry points 16, 17, 18 of the threat intelligence engine 13, so that certain events in the document sandbox engine are reported to the threat intelligence engine 13 and can be used to analyse the behaviour of the electronic document 10.

In the following, the process of determining a threat score of the electronic document 10 will be described with reference to the system 1 as shown in FIG. 1 and a web crawler 4 of the system 1 as shown in FIG. 2.

First, an electronic document 10 is loaded and rendered by the document sandbox module 7 operating the document sandbox. While loading and rendering the electronic document 10, the document sandbox is monitored by the monitoring module 8 for events triggered by the electronic document 10 and belonging to one of at least two predefined event classes. E.g. when the document sandbox is a web sandbox, the activity of the employed browser engine is tightly monitored with help of interfaces into the browser engine for any suspicious behaviour. Each event observed while monitoring is recorded in the event database 19 together with a respective event class it belongs to. The monitored event classes generally include different types of network resource requests of the document sandbox, script function invocations inside the document sandbox and document changes of the rendered electronic document 10.

Each network resource request event triggered by the document sandbox is analysed with regard to its meta data and/or content. Based on the meta data and/or content, network resource request events matching one of the following classes are recorded as suspicious events for consideration in the threat score: requests of resources from locations different from an origin of the electronic document, requests of resources from locations in different countries than the origin of the electronic document, requests of documents for which a threat score outside a predefined acceptable range has been determined earlier (and is stored in the filter database 2), requests of resources from locations matching a pattern defined on a location blacklist, requests transferring data tokens to locations matching a pattern defined on the location blacklist, and resources matching a predefined pattern of malicious content.

Each script function invocation event triggered by the document sandbox is analysed with regard to the respective script function. Events where the invoked script function matches one of the following classes are recorded as suspicious events for consideration in the threat score: invocations of functions manipulating the rendered document without user interaction, invocations of functions triggering a download without user interaction, and invocations of functions listed on a function blacklist.

Finally each document change event triggered by the document sandbox is analysed with regard to the respective type of change performed on the electronic document. Specifically changes introducing hidden or invisible elements into the document and/or changes introducing elements referring to resources from locations different from an origin of the electronic document are recorded as suspicious events for consideration in the threat score.

While monitoring the document sandbox for the above-described event classes, the document sandbox module 7 is controlled by the interaction simulation module 21 of the threat level engine 13 to simulate user interactions with the electronic document 10. The user interactions simulated by the interaction simulation module 21 comprise simulated mouse movements, simulated mouse clicks and/or keyboard inputs. All events occurring during the process are recorded and stored together with the respective event classes in the event database 19.

When the analysis, including loading, rendering and simulation of user interaction, is finished, a threat score of the electronic document is determined by the collector 6 based on predefined numerical weights stored in the weights database 20 is association with each of the predefined event classes to which the recorded events belong.

The determined threat score of the electronic document is stored in a filter database 2. In addition each determined threat score is compared with a first range of threat scores associated with a "good" or "safe" threat category (e.g. low watermark at threat score zero), with a second range of threat scores associated with a "needs review" threat category (between low watermark and high watermark) and with a third range of threat scores associated with a "bad" or "unsafe" threat category (above high watermark). The outcome of the comparison, i.e. the matching threat category is also stored in the filter database 2 together with the threat score. Based on the exemplary numerical weights mentioned earlier, the low watermark may be 4 and the high watermark may be 6.

Within the scope of the present invention according to a method for filtering access to electronic documents a threat category of an electronic document to be accessed can be determined by querying the filter database 2 and denying the access when the electronic document belongs to the "unsafe" threat category.

The method performed by the web crawlers 4 in the above example can preferably be defined in a computer program product for determining a threat score of an electronic document, the computer program product comprising program parts, which when loaded onto a computer are designed to perform the method steps described above. This computer program product may subsequently be distributed e.g. to Platform as a Service (PaaS) or Function as a Service (FaaS) providers, where the computer program product is executed to achieve the objective of the present invention.

The invention claimed is:

1. A method for determining a threat score of an electronic document, the method comprising the steps of:
    loading and rendering the electronic document in a document sandbox, the document sandbox adapted to simulate user interaction with the electronic document before a user is given access to the electronic document, and the document sandbox implemented without displaying the electronic document in a graphical user interface so as to speed up execution of loading web pages;
    querying a list of all available navigation elements in the electronic document from the document sandbox;
    controlling the document sandbox to simulate user interaction with the electronic document based on the queried list while recording observed events during the simulation of user interaction;
    during the loading and rendering step and during the controlling step, monitoring the document sandbox for events triggered by the electronic document and belonging to one of at least two predefined event classes;
    recording each observed event during the monitoring of the document sandbox together with a respective event class to which each observed event belongs; and
    determining, before the user is given access to the electronic document, the threat score of the electronic document based on predefined numerical weights associated with each of the predefined event classes to which the recorded events belong, thereby determining the threat score using events recorded during simulation of user interaction with the electronic document.

2. The method according to claim 1, wherein a simulated user interaction comprises simulated mouse movements, simulated mouse clicks, and/or keyboard inputs.

3. The method according to claim 1, wherein one or more of the at least two predefined event classes are network resource requests of the document sandbox.

4. The method according to claim 3, wherein meta data and/or content of any network resource request of the document sandbox are analysed for one or more of the following network resource request classes, which are part of the at least two predefined event classes:
    requests of resources from locations different from an origin of the electronic document;
    requests of resources from locations in different countries than the origin of the electronic document;
    requests of documents for which a threat score outside a predefined acceptable range has been determined earlier;
    requests of resources from locations matching a pattern defined on a location blacklist;
    requests transferring data tokens to locations matching the pattern defined on the location blacklist; and/or
    resources matching a predefined pattern of malicious content.

5. The method according to claim 1, wherein one or more of the at least two predefined event classes are script function invocations inside the document sandbox.

6. The method according to claim 5, wherein script functions invoked during script execution are analysed for one or more of the following function invocation classes, which are part of the at least two predefined event classes:
    invocations of functions manipulating the rendered document without user interaction;
    invocations of functions triggering a download without user interaction; and/or
    invocations of functions listed on a function blacklist.

7. The method according to claim 1, wherein one or more of the at least two predefined event classes are document changes.

8. The method according to claim 7, wherein the document changes are analysed for one or more of the following document change classes, which are part of the at least two predefined event classes:
    changes introducing hidden or invisible elements into the electronic document; and/or changes introducing elements referring to resources from locations different from an origin of the electronic document.

9. The method according to claim 1, further comprising storing the recorded events together with the respective event classes in an event database.

10. The method according to claim 1, further comprising storing the determined threat score of the electronic document in a filter database.

11. The method according to claim 1, further comprising comparing the determined threat score with one or more predefined ranges of threat scores, wherein each range is associated with a threat category.

12. The method according to claim 11, further comprising filtering access to an electronic document by determining a threat category of an electronic document to be accessed and denying the access when the electronic document belongs to a predefined threat category.

13. A non-transitory computer readable medium containing a computer program product for determining a threat score of an electronic document, the computer program product comprising program parts, which when loaded onto a computer are configured to:

load and render the electronic document in a document sandbox, the document sandbox adapted to simulate user interaction with the electronic document before a user is given access to the electronic document, and the document sandbox implemented without displaying the electronic document in a graphical user interface so as to speed up execution of loading web pages;

query a list of all available navigation elements in the electronic document from the document sandbox;

control the document sandbox to simulate user interaction with the electronic document based on the queried list while recording observed events during the simulation of user interaction;

while loading and rendering the electronic document and while controlling the document sandbox to simulate user interaction with the electronic document, monitor the document sandbox for events triggered by the electronic document and belonging to one of at least two predefined event classes;

record each observed event together with a respective event class to which each observed event belongs; and determine, before the user is given access to the electronic document, the threat score of the electronic document based on predefined numerical weights associated with each of the predefined event classes to which the recorded events belong, thereby determining the threat score using events recorded during simulation of user interaction with the electronic document.

14. A computer system for determining a threat score of an electronic document, the computer system comprising:
a computer comprising a non-transitory computer readable medium containing a computer program product for determining the threat score of the electronic document, the computer program product comprising program parts; and
a computer program stored in the non-transitory computer readable medium executable on the computer, the computer program including:
a document sandbox module for, when executed by the computer, loading and rendering an electronic document, the document sandbox adapted to simulate user interaction with the electronic document before a user is given access to the electronic document, and the document sandbox implemented without displaying the electronic document in a graphical user interface so as to speed up execution of loading web pages;
an interaction simulation module connected to the document sandbox module and configured to, when executed by the computer, query the document sandbox for a list of all available navigation elements in the electronic document and to control the document sandbox module to simulate user interaction with the electronic document based on the queried list while recording observed events during the simulation of user interaction;
a monitoring module connected to the document sandbox module and configured to, when executed by the computer, monitor the document sandbox module for events belonging to one of at least two predefined event classes and to record each observed event together with a respective event class to which each observed event belongs; and
a scoring module connected to the monitoring module and configured to, when executed by the computer, determine, before the user is given access to the electronic document, a threat score based on predefined numerical weights associated with each of the predefined event classes to which the events recorded by the monitoring module belong, thereby determining the threat score using events recorded during simulation of user interaction with the electronic document.

15. The computer system of claim 14, wherein the user interaction simulated by the interaction simulation module comprises simulated mouse movements, simulated mouse clicks, and/or keyboard inputs.

16. The computer system of claim 14, wherein one or more of the at least two predefined event classes are network resource requests of the document sandbox.

17. The computer system of claim 14, wherein one or more of the at least two predefined event classes are script function invocations inside the document sandbox.

18. The computer system of claim 14, wherein one or more of the at least two predefined event classes are document changes.

19. The computer system of claim 18, wherein the document changes are analysed by the monitoring module for one or more of the following document change classes, which are part of the at least two predefined event classes:
changes introducing hidden or invisible elements into the electronic document; and/or
changes introducing elements referring to resources from locations different from an origin of the electronic document.

20. The computer system of claim 14, wherein the scoring module is further connected to a filter database and configured to store the determined threat score of the electronic document in the filter database.

* * * * *